INVENTORS:
GERRIT H. REMAN
FREDERIK J. ZUIDERWEG
EDWIN C. GOLDMAN 3,495,380
PREVENTION OF GAS HYDRATE FORMATION IN GAS TRANSPORT PIPELINES
Gerrit H. Reman and Frederik J. Zuiderweg, Amsterdam, and Edwin C. Goldman, The Hague, Netherlands, assignors to Shell Oil Company, New York, N.Y., a corporation of Delaware
Filed June 22, 1967, Ser. No. 648,164
Claims priority, application Great Britain, Feb. 24, 1967, 8,862/67
Int. Cl. B01d 47/02
U.S. Cl. 55—32      12 Claims

ABSTRACT OF THE DISCLOSURE

A method and apparatus for preventing the formation of gas hydrates in underwater gas transport pipelines by at least partially filling a section of a pipeline with a water-absorbing liquid and continuously or intermittently replacing the liquid with fresh or regenerated liquid when the rate of water absorption drops below a desired value.

---

The invention relates to a process for the dehydration of a gas that is carried off through a pipeline from one or more underwater wells and to an apparatus for carrying out that process.

Water vapor, which is generally present in natural gas, may give rise to the formation of solid gas hydrates that may cause a considerable decrease in the capacity of the pipeline for transporting gas and may even cause clogging up. Owing to the high pressure of the gas in the pipeline the formation of gas hydrates may start at temperatures far above the freezing point of water. In this connection it should be noted that the temperature at which the gas hydrates are formed is dependent not only on the gas pressure but also on the composition of the gas and the concentration of the water vapor. By lowering the concentration of the water vapor it can be ensured that under the prevailing conditions of temperature, gas composition and pressure, the formation of hydrates is no longer possible. A known procedure is to reduce the concentration of the water vapor by bringing the gas into contact with a water-absorbing liquid, such as an alcohol or a polyhydric alcohol. According to this procedure, the gas is brought into very close contact with, for instance, glycol in the pipeline at a point where the temperature has not yet been so low that gas hydrates have been able to form. After the contact between gas and liquid the liquid may then be raised in temperature in order to expel the water, whereupon the liquid, after cooling down, can be used again. For this purpose use is made of liquids having a higher boiling point than that of water.

With gas originating from one or more underwater wells, a decrease in temperature down to the temperature where gas hydrates form will in many cases occur rapidly, particularly with pipelines in seas or bays in regions having a cool climate. In those cases the gas will have to be dehydrated at a location at a great distance from the shore. When using known techniques it is necessary to install a plant for gas treatment and liquid regeneration on an offshore installation which accordingly involves a high cost for the needed equipment.

It is to the solution for this problem that the present invention is directed.

According to the invention the dehydration of a gas from one or more underwater wells carried off through a pipeline is effected by bringing the gas into contact with a water-absorbing liquid, whereby a part of the pipeline is filled at least partly with the water-absorbing liquid, which liquid is changed at least intermittently. By carrying out the treatment of the gas in the pipeline there are no restrictions as regards the choice of a suitable site. The dehydration will preferably be carried out at a low temperature, because under those conditions a greater amount of water can be absorbed by the liquid at a comparatively high rate. The most suitable location for treatment of the gas in the pipeline is upstream of the point where formation of gas hydrates may occur. The quantity of liquid required and the required length of the part of the pipeline where the contact takes place will depend on conditions prevailing on the site, such as gas pressure, minimum temperature, water vapor concentration, gas composition and size of the gas stream.

An important advantage of the new method is that it does not require the presence of a large offshore installation, since the treatment of the gas takes place in the gas pipeline. However, the liquid should be prevented from spreading throughout the pipeline. This would decrease the capacity of the line for transporting gas.

If a number of gas wells are located a short distance from each other, it will be possible to first connect these wells to a central pipeline for the further common transport of the gas to the shore and to effect the treatment of the gas in that central pipeline.

The invention will now be described with the aid of the following figures in which.

Figure 1:
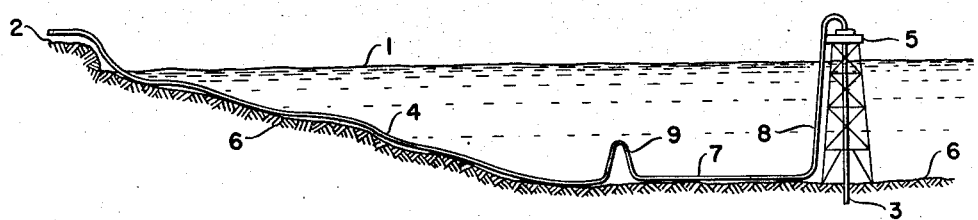
FIGURE 1 is an elevational view of a gas transport pipeline in which dehydration of the gas takes place according to the invention.

In FIGURE 1 numeral 1 represents the water surface of a body of water and 2 the shore. A gas well is located at 3 from which the gas is transported to the shore via a pipeline 4. The pipeline 4 comes up a short distance above the platform 5, which is desirable, though not necessary, for the installation of valves and other equipment (not shown). The pipeline 4 follows mainly the profile of the bottom 6 of the body of water. An essentially flat gas/liquid contacting section 7 of the pipeline 4 is located between two upwardly bent portions of the pipeline, 8 and 9. The section 7 is partly filled, in a way which hereafter will be further indicated, with a water-absorbing liquid. Care is taken that sufficient liquid is present in the part for the desired dehydration of the gas. The liquid is prevented from spreading through the remaining part of the pipeline 4 by the portions 8 and 9 that are bent upwards. For this reason the portions 8 and 9 should be sufficiently long, which will depend upon the local conditions of gas flow and diameter of the pipeline. The contact between the gas and the liquid in the section 7 is effected by the gas passing lightly over the surface of the liquid. The part 7 will preferably be arranged so that it follows an essentially horizontal course. In this example use is made of the upward bent section 8 which is present for obvious reasons. If the section 7 of the pipeline is located further downstream in the pipeline an upward bent portion similar to 9 should be present at the upstream side of the part 7 to assure that the liquid remains in the section 7.

Figure 2:
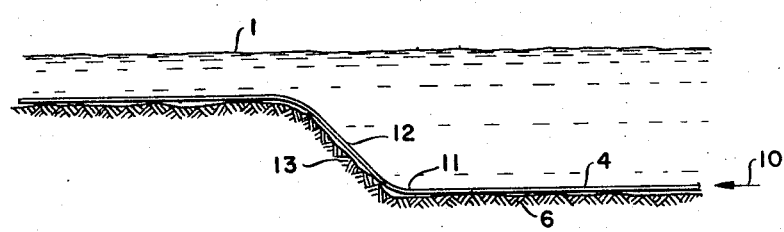
FIGURE 2 is an elevational view of a modified form of a pipeline that is suitable for the dehydration of the gas.

FIGURE 2 shows another embodiment. In this and the following figures the numerals used before denote the same items as represented by them in FIGURE 1.

The gas flows through pipeline 4 in the direction indicated by arrow 10. The liquid is introduced into the pipeline 4 at point 11 located at a low level of a section 12 of the pipeline 4, which section has an upward slope in the direction of gas flow. Enough liquid is supplied that in the upward sloping section 12 a liquid column forms through which the gas ascends as bubbles. For this purpose the pipeline 4 may especially be provided with an upward sloping part, for instance near the well. It is also possible for this purpose to make use of an upward slope present in the pipeline 4 owing to a curvature of the bottom 6, as shown at 13 in FIGURE 2.

In addition, the section of the pipeline in which the liquid and the gas are brought into contact with each other may consist of two or more pipe sections arranged in parallel. When multiple parallel lines are used, there are the advantages of a decrease of gas velocity and a decrease in the length of that part, as well as an increase in the area of the surface of contact.

Advantages may be obtained when the section of the pipeline in which the liquid and the gas are brought into contact with each other is provided with means that promote the contact. These means may consist of baffles or projections (not shown) attached to the inside of the pipeline. It is also possible to install trays with apertures or slits. Moreover, the liquid may be introduced into the pipeline by one or more atomizers, so that the gas at first comes into contact with droplets of liquid, which promotes contacting.

The supply of liquid to the pipeline section in question may take place via an auxiliary line for liquid supply. As a rule the liquid will be supplied from the shore. The auxiliary line for liquid supply may be attached to the outside of the pipeline carrying the gas. The liquid supply line has a small diameter compared with the pipeline carrying the gas, because the quantity of liquid to be pumped is comparatively small. The liquid may be pumped directly into the pipeline section in question. It is also possible to maintain a buffer stock of liquid in the neighborhood of the point of introduction into the pipeline. This may be done by placing a storage vessel for liquid under water or on an offshore installation near the gas well, for example, platform 5.

Figure 3:
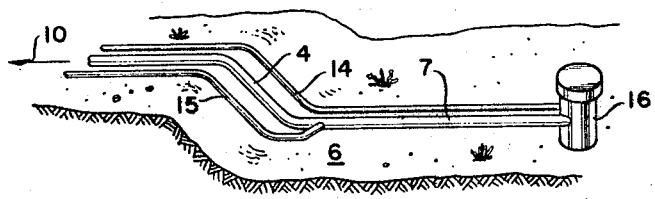
FIGURE 3 is a perspective view of a pipeline disclosing additional flowlines for the supply and the discharge of water-absorbing liquid to the pipeline; and, FIGURE 4 is a schematic diagram of a closed circulating system for the water-absorbing liquid.

As soon as the water content of the liquid reaches a value which causes the rate of water absorption to drop below a desired value, the liquid in the pipeline has to be changed. The liquid to be changed may be discharged into the water via a valve that can be operated from the shore or the liquid to be changed may be discharged for regeneration via an auxiliary line for liquid discharge. The auxiliary line for liquid discharge may have similar dimensions to those of the auxiliary line for liquid supply and may likewise be attached to the outside of the pipeline carrying the gas. An arrangement utilizing liquid supply and discharge lines is shown in FIGURE 3.

In this example the pipeline starting at the gas well 3 does not come up over the water surface. The valves on the gas well are here located under water at the wellhead 16. It is not even necessary to have an upward bent section in the pipeline at the upwards stream side of the part 7 due to the presence of the valves. At the beginning of the section 7 of the pipeline 4 the water-absorbing liquid is introduced into the pipeline through the auxiliary line for liquid supply 14. The liquid to be changed is discharged through the auxiliary line for liquid discharge 15. The points where 14 and 15 are connected to the part 7 may be interchanged, so that gas and liquid are made to flow countercurrently. The process is preferably carried out continuously. Known means, such as weirs and discharge pipes, may be used to keep the liquid in the pipeline section 7 at a desired level. However, the desired level may also be maintained by an appropriate choice of the point of connection of the auxiliary line for liquid discharge 14.

It is also possible for the liquid to be changed intermittently. In this case use can be made of valves located in the auxiliary line for liquid supply and the auxiliary line for liquid discharge near the pipeline, which valves may be operated by remote control, for instance from the shore. These valves are opened when the liquid is changed.

Another possibility is that the liquid to be discharged during the intermittent renewal is driven forward in front of a body or so-called "pipeline pig" that fits the pipeline and is carried along with the gas stream, the liquid thus being carried off for regeneration. This possibility obviates the need for the auxiliary line for liquid discharge, but now an apparatus for launching the bodies has to be present at a location between the well and the liquid-containing section of the pipeline. As a rule this is an installation that is mounted above the water surface. The installation may be operated by means of remote control from the shore. Suitable bodies may be spheres, cushions, plugs, cylinders equipped with collars. Naturally, when employing this process the pipeline must be free of interior obstacles. Furthermore, a "pig" cannot be employed when there are pipeline sections arranged in parallel.

The dehydration of the gas in the pipeline under water need only be effected to such an extent that gas hydrates cannot form in that pipeline. The gas arriving on the shore may therefore still contain water vapor but, preferably, the water vapor will be removed entirely or substantially to prevent further formation of gas hydrates. The reason for preferably removing substantially all the water vapor is that the temperature of the pipeline on the shore may drop to lower values than occur in the pipeline under water. Also, a decrease in temperature of the gas may also occur due to throttling. Thus, it is desirable that the discharged liquid be regenerated at a location somewhere on the shore, and the regenerated liquid employed at that location for the further dehydration of the gas that is carried through the pipeline to the shore. Thereafter, the liquid is carried through the auxiliary line for liquid supply to the section of the pipeline where the gas and the liquid are brought into contact with each other. Thus, the liquid that is carried to the pipeline through the auxiliary line for liquid supply already contains a quantity of water, but the capacity of that liquid for absorption of water is sufficiently high to effect dehydration of the gas in the pipeline under water to a level below the level where formation of gas hydrates is possible. An important advantage obtained in this process is that regeneration of the liquid, heating up followed by cooling down, need take place only once during each cycle. An attendant advantage is that the liquid to be pumped through the auxiliary line for liquid supply possesses, owing to the presence of water in that liquid, a lower viscosity and a lower freezing point than that of the regenerated liquid.

Figure 4:
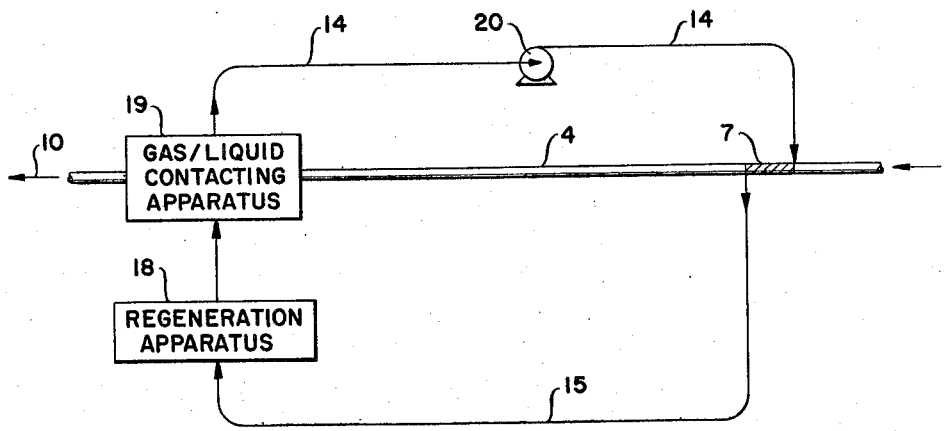

This process is diagrammatically represented in FIGURE 4. The gas flows through the pipeline 4 in the direction indicated by the arrow 10. As shown, the pipeline section 7 is located under water whereas the regeneration apparatus 18, gas/liquid contacting apparatus 19 and pump 20 are located on shore. Water-absorbing liquid is carried through the auxiliary line for liquid supply 14 to the underwater section of the pipeline where the gas and the liquid are brought into contact with each other. This section is represented by the numeral 7. The gas leaving section 7 is dehydrated to a sufficient extent to render the formation of gas hydrates further on in the pipeline impossible. The liquid is passed through the auxiliary line for liquid discharge 15 to a regeneration apparatus 18, where the liquid is regenerated, for instance, by heating to drive off the water vapor. After cooling, the liquid is passed to a gas/liquid contacting apparatus 19 of any known type, where the gas having been partially dehydrated in section 7 is dehydrated still further. The dry gas may then be stored in tanks or pumped directly to users via pipelines. The liquid leaving the contacting apparatus 19, which already contains a small quantity of water, is pumped through the auxiliary line for liquid supply 14 by means of pump 20. Although some water has been absorbed, the capacity of the liquid for absorbing water is still sufficiently high to effect the intended dehydration in the section 7.

Advantages may be obtained when the part of the pipeline where the gas and the liquid are brought into contact with each other is cooled. Cooling of the gas to a temperature approximately equal to that of the water at the site where the gas comes into contact with the water-absorbing liquid is desirable in the case where the gas is at a higher temperature than the water. This case may occur when the location chosen for section 7 of the pipeline is close to the well, for example, when the curvature of the bottom so dictates.

Cooling may be effected by exposing section 7 of the pipeline to the water as much as possible, e.g., by not burying that part. In order to prevent floating the wall thickness of that part could be increased.

Pipelines under water are generally provided with jackets made of concrete for the purpose of anchorage. If such jackets are applied along the section to be cooled, a weight coating having high thermal conductivity should preferably be used. Alternatively, the weights could be spaced at regular intervals, leaving a large part of the pipeline along section 7 directly exposed to the water.

We claim as our invention:

1. A process for the prevention of gas hydrate formation in a substantially constant diameter underwater gas transport pipeline connected to an underwater gas well to carry off the produced gas from said well, said process comprising:
    at least partially filling an underwater portion of said pipeline with a water-absorbing liquid; said pipeline having an upward slope at the downstream end of said portion;
    bringing said gas into contact with said water-absorbing liquid to remove moisture from said gas;
    periodically removing from said underwater portion of pipeline said water-absorbing liquid upstream of the slope and when the rate of water absorption of said liquid drops below a desired value; and,
    repeating the above cycle by replacing said spent water-absorbing liquid with a fresh supply of water-absorbing liquid by pumping said liquid through a pipeline extending from a remote location.

2. A process according to claim 1 wherein said spent water-absorbing liquid is removed from said pipeline by:
    discharging said liquid into the water surrounding said pipeline.

3. A process according to claim 1 including the step of:
    cooling the portion of said pipeline where said gas and said liquid are brought together.

4. A process according to claim 1 wherein said portion of said pipeline is completely filled with said liquid.

5. A process according to claim 4 wherein an upwardly sloping section of said pipeline in the direction of flow of said gas is completely filled with said liquid.

6. A process according to claim 1 including the steps of:
    regenerating said liquid after removing it from said pipeline by removing moisture from said liquid; and recycling said liquid back to said pipeline.

7. A process according to claim 6 including the step of:
    contacting said regenerated liquid with said gas at a point downstream of said portion of said pipeline containing said liquid to thereby further remove moisture from said gas.

8. An apparatus for the prevention of gas hydrate formation in a gas transport pipeline positioned along the floor of a body of water, comprising:
    a gas well underlying said body of water;
    a substantially constant diameter pipeline connected to said well and extending to shore to carry off the gas produced by said well;
    a portion of said pipeline comprising an under water gas/liquid contacting pipe section of the same diameter having an upstream and a downstream end and adapted to be at least partially filled with a water-absorbing liquid;
    said pipeline being formed with an upward slope at the downstream end of said section to prevent said liquid from passing through said pipeline;
    pumping means for continuously injecting said liquid into the upstream end of said section;
    outlet means at the downstream end of said section to carry off said fluid;
    regeneration means connected to said outlet to remove moisture from said liquid; and,
    flow means interconnecting said regeneration means and said pumping means to carry said liquid back to said pumping means after it has been regenerated to thereby establish a closed circulating liquid system.

9. An apparatus according to claim 8 wherein said contacting section is substantially horizontal and said pipeline is formed with an upward slope at each end of said section.

10. An apparatus according to claim 8 including:
    a gas/liquid contacting apparatus connected in said pipeline downstream of said gas/liquid contacting section to permit said gas to pass through said apparatus, and wherein said apparatus is also connected in said flow means interconnecting said regeneration means and said pumping means to permit said liquid to flow through said apparatus after said liquid has passed through said regeneration means,
    whereby said gas in said pipeline is again contacted with said liquid after said liquid has been regenerated to thereby further remove water from said gas.

11. An apparatus according to claim 8 wherein:
    said gas/liquid contacting section of said pipeline comprises an upwardly sloping section; and,
    said pipeline is substantially horizontal at each end of said section.

12. An apparatus according to claim 8 wherein said section is completely filled with said liquid.

References Cited

UNITED STATES PATENTS

| | | | |
|---|---|---|---|
| 337,408 | 3/1886 | Keanns | 48—190 |
| 3,206,916 | 9/1965 | Glasgow et al. | 55—32 |
| 3,384,169 | 5/1968 | Leonard | 166—0.5 |

REUBEN FRIEDMAN, Primary Examiner

CHARLES N. HART, Assistant Examiner

U.S. Cl. X.R.

48—190; 55—171; 166—0.5